Patented Oct. 20, 1931

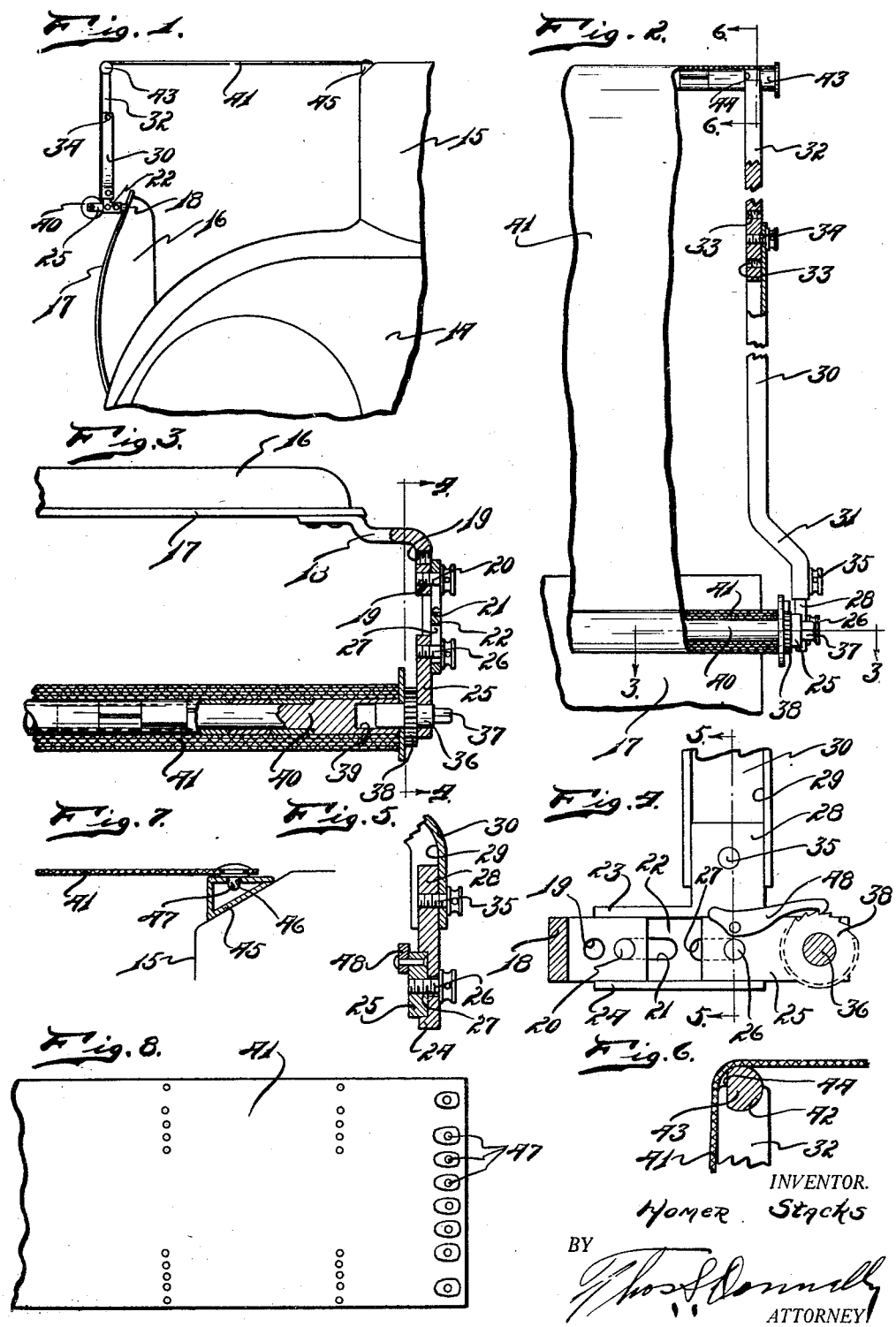

1,828,480

UNITED STATES PATENT OFFICE

HOMER STACKS, OF DETROIT, MICHIGAN

DETACHABLE VEHICLE TOP

Application filed November 10, 1930. Serial No. 494,461.

My invention relates to a new and useful improvement in a detachable vehicle top adapted for use particularly as a cover for protecting occupants of rumble seats from the elements, and to serve as a shade.

It is another object of the invention to provide in a device of this kind, a bracket which will serve to support the covering member spaced rearwardly of the seat back sufficiently so as not to interfere with the comfort of the occupants of the vehicle seat and prevent their heads from coming into contact therewith.

Another object of the invention is the provision in a device of this kind of a roller bracket which may be adjustable to accommodate the device to various conditions and which may be easily and quickly assembled in position.

Other objects will appear hereinafter.

The invention consists in the combination and arrangement of parts hereinafter described and claimed.

The invention will be best understood by a reference to the accompanying drawings which form a part of this specification, and in which, Fig. 1 is a side elevational view of the invention showing it applied to a vehicle.

Fig. 2 is a fragmentary rear elevational view, with parts broken away and parts shown in section.

Fig. 3 is a fragmentary view taken on line 3—3 of Fig. 2.

Fig. 4 is a fragmentary view taken on line 4—4 of Fig. 3.

Fig. 5 is a fragmentary sectional view taken on line 5—5 of Fig. 4.

Fig. 6 is a fragmentary sectional view taken on line 6—6 of Fig. 2.

Fig. 7 is a transverse sectional view of an attaching member mounted on the vehicle cupola.

Fig. 8 is a fragmentary plan view of the curtain used in the invention.

The invention is adapted for use on a vehicle 14 having a cupola or coupe body 15 positioned rearwardly of which is a swingably mounted seat 16 commonly termed a "rumble seat". Secured to the back 17 of the seat 16 and projecting laterally outwardly therefrom, and thence rearwardly, is a supporting bracket 18 having openings 19 formed therein for reception of the screw 20 which is projected through a slot 21 formed in the connecting or supporting link 22 which is provided with the flanges 23 and 24 which engage the upper and lower edges, respectively, of the rearwardly projecting portion of the bracket arm 18 and of the roller supporting plate 25. This supporting plate 25 is secured in position by the screw 26 which is projected through the slot 27 formed in the link 22. This link 22 is L shaped and has the upwardly projecting portion 28 engaging in the channel 29 formed in the upwardly projecting supporting arm 30 which is inwardly offset as at 31, and thence extended upwardly to serve as a support for the extension support 32 which is provided with the threaded openings 33 for reception of the clamping screw 34.

The construction at each side of the seat is the same, and a description of one side will suffice for both.

A clamping screw 35 serves to secure the member 30 to the upwardly projecting portion 28. Rotatably mounted on the roller supporting plate 25 is a shaft or trunnion 36 having the flat faced end 37 for reception of a crank, wrench, or other suitable rotating tool. A ratchet wheel 38 is fixedly mounted on the shaft 36. The shaft 36 is projected into the flat faced socket 39 formed in the spring roller 40 on which is wound the flexible cover 41. The notch 42 is formed in the upper end of the extension supports 32 for reception of a rail 43 having the flat face 44.

Mounted on the rear top edge of the cupola 15 and extending transversely of the vehicle is a hollow engaging member 45 having a plurality of openings 46 formed therein for reception of the male portion 47 of a snap fastener. Rockably mounted on the roller supporting plate 45 is a dog 48 which normally lies in engagement with a ratchet wheel 38.

In use, after the supporting members 30 and the extension supports 32 have been adjusted to the proper height, and the position of the supporting plate 25 relatively to the bracket 18 determined, the flexible roller 41 is then unrolled and drawn over the rail 43 and the snap fasteners inserted in the openings 46. The roller may then be rotated with a crank or suitable wrench to draw the curtain 41 to the desired degree of tautness, the dog 48 preventing the unwinding of the flexible cover after it has been drawn taut.

When it is desired to close the seat 16, the supports 30 and the connections projecting thereabove may be easily and quickly removed for storing away, and the roller 40 may, when desired, be removed from its mountings, either separately or together with the plate 25 and the link 22 so that the appearance of the vehicle is changed but little when the seat 16 is closed. When the parts are removed, the only remaining visible parts would be the brackets 18 and the fastening plate 45.

The structure is one which is quite economically manufactured, easily and quickly mounted in position, and most efficient and durable in use.

While I have illustrated and described the preferred forms of construction of my invention, I do not wish to limit myself to the precise details of structure shown, but desire to avail myself of such variations and modifications as may come within the scope of the appended claims.

Having thus described my invention, what I claim as new, and desire to secure by Letters Patent is:

1. In a device of the class described adapted for use in a vehicle seat: brackets secured to and projecting laterally outwardly from and rearwardly of said seat; a connecting link connected to said bracket and projecting rearwardly therefrom; a supporting plate connected to said link and projected rearwardly therefrom; a shaft rotatably mounted on said supporting plate; and a roller fixedly mounted on said shaft.

2. In a device of the class described adapted for use with a seat: a pair of brackets each mounted at opposite sides of said seat and projecting laterally therefrom and rearwardly thereof; a connecting link secured to each of said brackets and projecting rearwardly therefrom and provided with an upwardly projecting portion; a roller supporting plate secured to and projecting rearwardly from said link; and an upwardly directed supporting arm mounted on said upwardly directed portion of said link.

3. In a device of the class described adapted for use with a seat: a bracket mounted at opposite sides of said seat and projected laterally therefrom and rearwardly thereof; a link secured to the end of said bracket and extending rearwardly thereof, said link being provided with a channel for embracing said bracket; an upwardly turned portion on said link; an upwardly directed supporting member secured to said upwardly turned portion and provided with a channel for the reception thereof.

4. In a device of the class described adapted for use with a seat: a bracket mounted at opposite sides of said seat and projected laterally therefrom and rearwardly thereof; a link secured to the end of said bracket and extending rearwardly thereof, said link being provided with a channel for embracing said bracket; an upwardly turned portion on said link; an upwardly directed supporting member secured to said upwardly turned portion and provided with a channel for the reception thereof; a roller supporting plate secured to said link and projecting rearwardly therefrom; a shaft rotatably mounted on said plate; and a roller mounted on said shaft.

In testimony whereof I have signed the foregoing specification.

HOMER STACKS.